3,736,281
METHOD OF MAKING PRESSURE-SENSITIVE HOT-MELT ADHESIVES
Thomas E. Russell, Verona, N.J., assignor to The Flintkote Company, White Plains, N.Y.
No Drawing. Continuation of abandoned application Ser. No. 739,626, June 25, 1968. This application Mar. 24, 1971, Ser. No. 127,795
Int. Cl. C09j 3/26
U.S. Cl. 260—27 R                               7 Claims

ABSTRACT OF THE DISCLOSURE

A pressure-sensitive adhesive composition having instant room temperature tack, good cold flow resistance and good shear strength which comprises as a first component a modified or unmodified rosin or rosin ester, as a second component a resinous rubbery block copolymer of styrene and butadiene or isoprene, and as a third component a polyterpene resin.

---

Thus application is a continuation of copending application Ser. No. 739,626, filed June 25, 1968, now abandoned.

This invention relates to pressure-sensitive adhesives, and more particularly to pressure-sensitive adhesives that have instant room temperature tack, good cold flow resistance and shear strength, form bonds that are essentially unaffected by moisture, and can be made as hot melts without solvents.

Countless uses exist for pressure-sensitive adhesives that have good quick tack at ordinary temperatures, adhere to numerous surfaces upon contact with essentially no pressure, are essentially free from cold flow, so-called "creep," resist shearing stresses, do not deteriorate under moist conditions and retain their desirable properties during prolonged periods of storage, i.e., have good shelf-life. Such uses include being thinly coated onto the under surfaces of floor tiles and wall tiles that thereafter can be set quickly and permanently on floors or walls. The pressure-sensitive adhesives of this invention are especially suited for making floor and wall tiles of the so-called "peel-and-stick" type, which are coated by the manufacturer and protected for storage by a sheet that is not affected by the adhesive and that can be peeled off easily at a job-site.

An object of this invention is to provide pressure-sensitive adhesives. Another object of this invention is to provide pressure-sensitive adhesives that have good instant tack, high strength in shear, virtually no cold flow, resistance to moisture and storage stability. A further objects of this invention is to provide a method for making such pressure-sensitive adhesive by hot-melt means without solvents. These and other objects of this invention will be in part discussed in and in part apparent from the following more detailed disclosure.

Broadly the pressure-sensitive adhesives of this invention contain three resinous components which, in intimate combination with one another in the proportions specified, provide the desirable properties hereinbefore discussed The primary components are a resinous rubbery block copolymer of styrene and butadiene or styrene and isoprene, a modified or unmodified rosin or rosin ester, and a polyterpene resin. Other ingredients can, of course, be included in the adhesives to attain additional desiderata, for example, an antioxidant can be added to protect the various resins, especially during hot-melt blending and coating of the adhesives in molten condition onto substrates. Moreover, by selection of particular components from among the variety of each available, the properties of the adhesive compositions can be modified somewhat as might be desired or necessary. For example, cold and hot flow for application and shear strength can be modified by the selection as well as the proportioning of the rubbery block copolymer component, and the softening point can be modified by the choice and amount of rosin, rosin ester or polyterpene.

Rubbery block copolymers of styrene and butadiene or styrene and isoprene that are especially advantageous to use in the instant adhesive are those in which the monomers are not randomly mixed but rather are in groups of poly-monomers, i.e., groups or blocks of polystyrene-polybutadiene-polystyrene or polystyrene-polyisoprene-polystyrene. The polystyrene groups have molecular weights of from about 5,000 to about 125,000, preferably between about 8,000 and 45,000. The polybutadiene or polyisoprene blocks have molecular weights of between about 15,000 and about 250,000, preferably from about 35,000 to about 150,000. The copolymer can contain from about 20% to about 80% of either block polymer. Such rubbery block copolymers are commercially available under the trade name "Kraton," for example, Kraton 101 and 102 which are polystyrene-polybutadiene-polystyrene copolymers, and Kraton 107 which is the polyisoprene counterpart. They can be used in amounts of between about 20% and about 55% by weight of the tri-component adhesive composition, preferably from about 35% to about 50% by weight. Combinations of different of the rubbery block copolymers can be used.

Another principal component of the subject adhesives is a modified or unmodified rosin or rosin ester, examples of which are ethylene glycol, polyethylene glycol, glycercol and pentaerythritol rosin esters, hydrogenated rosin esters or methylated rosin esters. Such rosins are commercially available as Ester 3 triethylene glycol ester of hydrogenated rosin and Ester 10 glycerol ester of hydrogenated rosin, "Foral" 85 and 105 highly stabilized ester resins, "Hercolyn" D hydrogenated methyl ester of rosin purified by steam distillation, and "Pentalyn" H pentaerythritol ester of hydrogenated rosin. The modified or unmodified rosins or rosin esters can be used in the adhesives in an amount of from about 25% to about 50% by weight, preferably between about 30% and about 45%. They also can be used in combination. For example, Foral 85 (softening point 81° C.) can be combined with Foral 105 (softening point 103° C.) to provide a different softening point of the adhesive as might be desired. Generally, the rosin or rosin ester is used in an amount ranging from about one-half to about equal the amount of the rubbery block copolymer, preferably at least about three-quarters as much.

The third principal component of the present adhesives is a liquid or solid resinous polyterpene, for example, poly($\alpha$-pinene) such as "Piccolyte Alpha" 10, 40 and 115 having corresponding softening points in ° C. and molecular weights of 100, 150 and 1200, and poly($\beta$-pinene) such as "Piccolyte" S-100 and S-115 having molecular weights of about 1200. From about 5% to about 35% by weight of the polyterpene component can be used, based on the weight of the adhesive composition, preferably between about 10% and 30% by weight and in an amount such that the total of the rosin and polyterpene components is in the range of about 50% to about 65%.

From about 0.01% to about 2.0% by weight of one or more antioxidants desirably are added to the adhesives. Antioxidants known to be effective for the various components, especially for the rubbery block copolymer, can be used, for example, "Ionox" 220 4,4-methylene-bis(2,6-di-t-butyl-phenol) and 330 2,4,6-tris(3,5-di-t-butyl-p-hydroxybenzyl)-1,3,5-trimethylbenzene, "Dalpac" 4C 2,6-di(t-butyl)-p-cresol, "Naugawhite" alkylated bisphenol, and "Butyl Zimate" zinc dibutyl dithiocarbamate. Ordinarily about 0.05% to about 1.0% of antioxidant, based on the amount of the adhesive composition, is sufficient.

The rubbery polystyrene-poly(conjugated diene)-polystyrene block copolymers are thermoplastic in nature and have no sharp melt point. Thus they cannot simply be melted with the other resins in any appreciably significant amount. It has been found possible, however, to avoid using a solvent for the rubbery copolymers, and instead to prepare the pressure-sensitive adhesive of this invention by a holt-melt technique. An additional benefit of the method is that the adhesives can be melt coated onto suitable substrates; solvent coating systems are unnecessary.

Initially a rubbery block copolymer, which ordinarily is produced in crumb form, is mechanically mixed with all or substantially all of the modified or unmodified rosin or rosin ester component to form an intimate preblend mix. Mastication of the two resins can be accomplished in an ordinary rubber mill or other high shear kneading or milling devices, for example, a Banbury mill. Preblending is at room temperature or up to about 150° F. Although it is possible to work at either lower or higher temperatures, practical factors tend to preclude doing so, for example, degradation of the resins and difficulty of blending and removing them. Preblending in a rubber mill at room temperature ordinarily requires in the order of about one-half hour to about three hours, usually about one hour, to prepare a uniform mix of rubbery, crepe-like consistency. The meltable preblend thus prepared can be diced or sliced for convenient subsequent melting.

The adhesive composition is completed by melting the preblended components in an agitated vessel heated at from about 300° F. to about 425° F., usually about 350° to 400° F. An antioxidant can be added as soon as it readily will mix with the melting preblend. Thereafter the other components of the adhesive are added directly to the hot melt, first preferably any of the rosin or rosin ester that was not preblended followed by the polyterpene resin. The entire batch is blended until a clear, smooth-running, homogeneous composition is formed. The composition can be coated onto a substrate, for example, in coatings from about 1 to about 5 mils thick, preferably about 2 to 4 mils, or can be cooled to a solid at room temperature for subsequent remelting and application, e.g., at about 350° F.

Adhesives according to this invention, which are at least essentially 100% solids, have a Brookfield Viscosity (No. 7 spindle at 300° F., 20 r.p.m.) in the range of about 25,000 to 150,000 cps., preferably about 35,000 to 65,000 cps.; a softening point (Ring and Ball, ASTM D-36-26) of at least about 200° F., preferably from about 225° F. to 275° F.; a penetration hardness (ASTM D-5-49, room temperature) in the range of about 0.35 cm. to 1.3 cm., preferably about 0.5 cm. to 0.8 cm.; and a loss on heating (ASTM D-6-39 T, 5 hours at 300° F.) of about 10% maximum, preferably below about 5%.

The following examples of specific embodiments of the invention are set forth to illustrate it.

EXAMPLE 1

A mix of 41.50 parts (by weight unless otherwise specified) of Kraton 101 polystyrene-polybutadiene-polystyrene block copolymer crumb and 41.50 parts of Pentalyn H pentaerythritol ester of hydrogenated rosin was masticated in a rubber mill for about one hour at room temperature until a uniform, crepe-like composition was formed. The composition was then melted at about 350° F. to 400° F. in a heated vessel having a stirrer. An antioxidant, 0.40 part of Ionox 330 hindered phenol, was added as the mix melted. Thereafter 16.60 parts of Piccolyte Alpha 25 poly(α-pinene) resin having a softening point of about 25° C. were added to the hot melt in the vessel. Mixing of the hot melt was continued for about one-half hour until a clear, smoothly-flowing, homogeneous composition was formed. The composition was poured into a mold and cooled to a resilient block at room temperature.

A portion of the solid adhesive composition thus prepared was melted and coated at about 350° F. onto 9″ x 9″ vinyl-asbestos floor tiles. The pressure-sensitive coating, which was about 3 mils thick on the tiles, had good quick tack, good pressure-sensitivity and virtually no cold flow. Some of the tiles were placed on a cleaned concrete floor on which they had excellent shear strength. Similar results were obtained with other tiles placed on a vertical plywood wall.

The adhesive composition was coated onto various materials and tested for peel strength (Pressure Sensitive Tape Council #1, at 180° F.) The results were 112 ounces per inch on plywood and greater than 160 oz./in. on stainless steel, asbestos cement and vinyl asbestos. The results were essentially the same both after four months under water and after accelerated shelf life at 130° F. The alkaline nature of the moist cement did not affect the adhesion. Silicon-treated parchment paper was placed on the adhesive coatings during storage, and could be peeled off easily for use.

EXAMPLE 2

A pressure-sensitive hot-melt adhesive was prepared substantially as described in Example 1 from a preblend of from 12.50 parts of Kraton 107, 37.50 parts of Kraton 101 and 37.50 parts of Foral 105 stabilized pentaerythritol rosin ester, to which preblend 12.00 parts of Piccolyte Alpha 25 and 0.5 part of Ionox 330 were added. Coatings of the adhesive on various substrates produced similar satisfactory results as described in Example 1.

EXAMPLE 3

A pressure-sensitive hot-melt adhesive was prepared substantially as described in Example 1 from a preblend of 13.4 parts of Kraton 107, 22.4 parts of Kraton 101 and 36.3 parts of Foral 105, to which preblend were added 18.4 parts of Piccolyte Alpha 25, 9.0 parts of Piccolyte S-10 and 0.5 part of Ionox 330. Coatings of the adhesive on various substrates produced similar satisfactory results as described in Example 1.

EXAMPLE 4

A pressure-sensitive hot-melt adhesive was prepared substantially as described in Example 1 from a preblend of 16.58 parts of Kraton 107, 27.68 parts of Kraton 101 and 44.26 parts of Pentalyn H, to which preblend were added 11.06 parts of Piccolyte Alpha 25 and 0.42 part of Ionox 330. Coatings of the adhesive on various substrates produced similar satisfactory results as described in Example 1.

EXAMPLE 5

A pressure-sensitive hot-melt adhesive was prepared substantially as described in Example 1 from a preblend of 9.10 parts of Kraton 107, 27.30 parts of Kraton 101 and 31.80 parts of Foral 105, to which preblend were added 13.20 parts of Piccolyte Alpha 25, 18.20 parts of Piccolyte Alpha 10 and 0.40 part of Ionox 330. Coatings of the adhesive on various substrates produced similar satisfactory results as described in Example 1.

It will of course be understood that numerous modifications can be made in the ingredients, proportions and conditions described in the foregoing examples without departing from the scope of this invention as disclosed hereinbefore and as defined in the claims appended hereafter.

I claim:
1. A method of making a pressure-sensitive adhesive composition having instant room temperature tack, good cold flow resistance and good shear strength which comprises: masticating together as a first component from about 25% to about 50% of an ethylene glycol, polyethylene glycol, glycerol or pentaerythritol rosin ester, a hydrogenated rosin ester or a methylated rosin ester, and as a second component from about 20% to about 55% of a polystyrene-polybutadiene-polystyrene or a polystyrene- polyisoprene-polystyrene block copolymer whose polystyrene blocks have molecular weights of from about 5000 to about 125,000 and are from about 20% to about 80% by weight of said block copolymer, and whose polybutadiene or polyisoprene blocks have molecular weights of from about 15,000 to about 250,000, to form a uniform preblend of them; melting said preblend to form a hot-melt mix thereof; and blending into said hot-melt mix, as a third component, from about 5% to about 35% of a poly-($\alpha$-pinene) or a poly-($\beta$-pinene) resin to form a homogeneous adhesive composition; said percent values being by weight of said adhesive composition.

2. A method of making a pressure-sensitive adhesive composition according to claim 1 wherein said polystyrene blocks have molecular weights of about 8000 to about 45,000 and said polybutadiene or polyisoprene blocks have molecular weights of about 35,000 to about 150,000.

3. A method of making a pressure-sensitive adhesive composition according to claim 1 wherein said first component is used in an amount of from about 30% to about 45%, said second component is used in an amount of from about 35% to about 50%, and said third component is used in an amount of from about 10% to about 30%.

4. A method of making a pressure-sensitive adhesive composition according to claim 1 wherein the combined amount of said first and said third components is from about 50% to about 65%.

5. A method of making a pressure-sensitive adhesive composition according to claim 1 wherein said preblend is formed at a temperature of from about 60° F. to about 150° F., and said hot-melt mix to make said homogeneous adhesive is blended at about 300° F. to about 425° F.

6. A method of making a pressure-sensitive adhesive composition according to claim 1 wherein the amount by weight of said first component preblended with said second component is from about one-half to about equal the amount by weight of said second component.

7. A method of making a pressure-sensitive adhesive composition according to claim 6 which further comprises blending the remaining portion of said first component into said hot-melt mix of said preblend prior to blending said third component therein.

References Cited
UNITED STATES PATENTS
| | | | |
|---|---|---|---|
| 3,239,478 | 3/1966 | Harlan | 260—27 |
| 3,325,430 | 6/1967 | Grasely | 260—27 |

FOREIGN PATENTS
| | | |
|---|---|---|
| 903,331 | 8/1962 | Great Britain. |

DONALD E. CZAJA, Primary Examiner

W. E. PARKER, Assistant Examiner

U.S. Cl. X.R.

260—93.3, 876, 879